United States Patent
Nishiumi et al.

(10) Patent No.: US 10,608,262 B2
(45) Date of Patent: Mar. 31, 2020

(54) FUEL CELL VEHICLE

(71) Applicants: TOYOTA JIDOSHA KABUSHIKI KAISHA, Toyota-shi, Aichi-ken (JP); TAIHO KOGYO CO., LTD., Toyota-shi, Aichi-ken (JP)

(72) Inventors: Hiroaki Nishiumi, Toyota (JP); Tatsuya Tokumasu, Toyota (JP)

(73) Assignees: Toyota Jidosha Kabushiki Kaisha, Toyota-shi, Aichi-ken (JP); Taiho Kogyo Co., Ltd., Toyota-shi, Aichi-ken (JP)

( * ) Notice: Subject to any disclaimer, the term of this patent is extended or adjusted under 35 U.S.C. 154(b) by 175 days.

(21) Appl. No.: 15/795,853

(22) Filed: Oct. 27, 2017

(65) Prior Publication Data

US 2018/0123149 A1 May 3, 2018

(30) Foreign Application Priority Data

Nov. 2, 2016 (JP) ................................. 2016-214855

(51) Int. Cl.
| | |
|---|---|
| *H01M 8/04* | (2016.01) |
| *B60L 3/00* | (2019.01) |
| *B60L 50/72* | (2019.01) |
| *H01M 8/04082* | (2016.01) |
| *H01M 8/2475* | (2016.01) |
| *B60L 50/71* | (2019.01) |

(Continued)

(52) U.S. Cl.
CPC .............. *H01M 8/04* (2013.01); *B60L 3/0007* (2013.01); *B60L 3/0053* (2013.01); *B60L 50/71* (2019.02); *B60L 50/72* (2019.02); *H01M 8/0273* (2013.01); *H01M 8/04201* (2013.01); *H01M 8/24* (2013.01); *H01M 8/2475* (2013.01); *H01M 2250/20* (2013.01); *Y02T 90/32* (2013.01)

(58) Field of Classification Search
CPC ............. B60L 50/70–72; B60L 3/0007; B60L 3/0053; H01M 2250/20; H01M 8/2475
See application file for complete search history.

(56) References Cited

U.S. PATENT DOCUMENTS

| | | | |
|---|---|---|---|
| 9,963,171 B2 * | 5/2018 | Nagaosa ........... | H01M 8/04201 |
| 2002/0189873 A1 * | 12/2002 | Mizuno ................... | B60K 1/04 180/65.31 |
| 2015/0097425 A1 | 4/2015 | Kimura et al. | |

(Continued)

FOREIGN PATENT DOCUMENTS

| | | |
|---|---|---|
| CN | 105591144 A | 5/2016 |
| JP | H08-192639 A | 7/1996 |

(Continued)

*Primary Examiner* — Erez Gurari
(74) *Attorney, Agent, or Firm* — Finnegan, Henderson, Farabow, Garrett & Dunner, LLP

(57) ABSTRACT

A fuel cell vehicle comprises a fuel cell module configured to include a fuel cell stack, a tank configured to store a gas that is supplied to the fuel cell stack, a fuel cell placement chamber configured to place the fuel cell module therein and a tank placement chamber formed on a rear side of the fuel cell placement chamber in a vehicle longitudinal direction of the fuel cell vehicle under a floor of the fuel cell vehicle and configured to place the tank therein. The fuel cell module is placed vertically above the tank such as not to overlap with the tank when being viewed in the vehicle longitudinal direction.

8 Claims, 10 Drawing Sheets

(51) Int. Cl.
*H01M 8/0273* (2016.01)
*H01M 8/24* (2016.01)

(56) References Cited

U.S. PATENT DOCUMENTS

| | | |
|---|---|---|
| 2016/0133982 A1 | 5/2016 | Takeyama |
| 2017/0066479 A1 | 3/2017 | Murata |
| 2017/0096172 A1 | 4/2017 | Nagaosa |

FOREIGN PATENT DOCUMENTS

| | | |
|---|---|---|
| JP | 2008-049961 A | 3/2008 |
| JP | 2015-061398 A | 3/2015 |
| JP | 2015-231319 | 12/2015 |
| JP | 2016-091840 A | 5/2016 |
| JP | 2016-137852 A | 8/2016 |
| WO | WO2013-157049 A1 | 10/2013 |

* cited by examiner (IN THE EVENT OF COLLISION)

SECOND EMBODIMENT

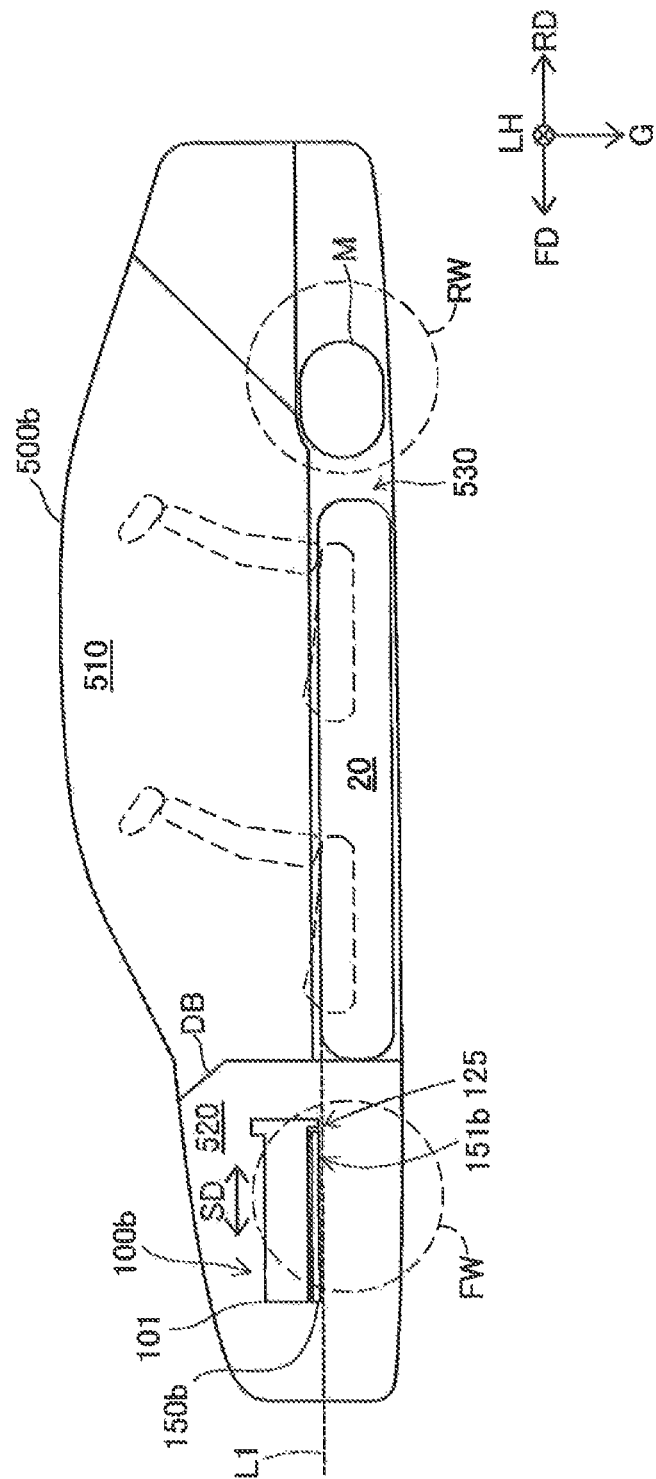

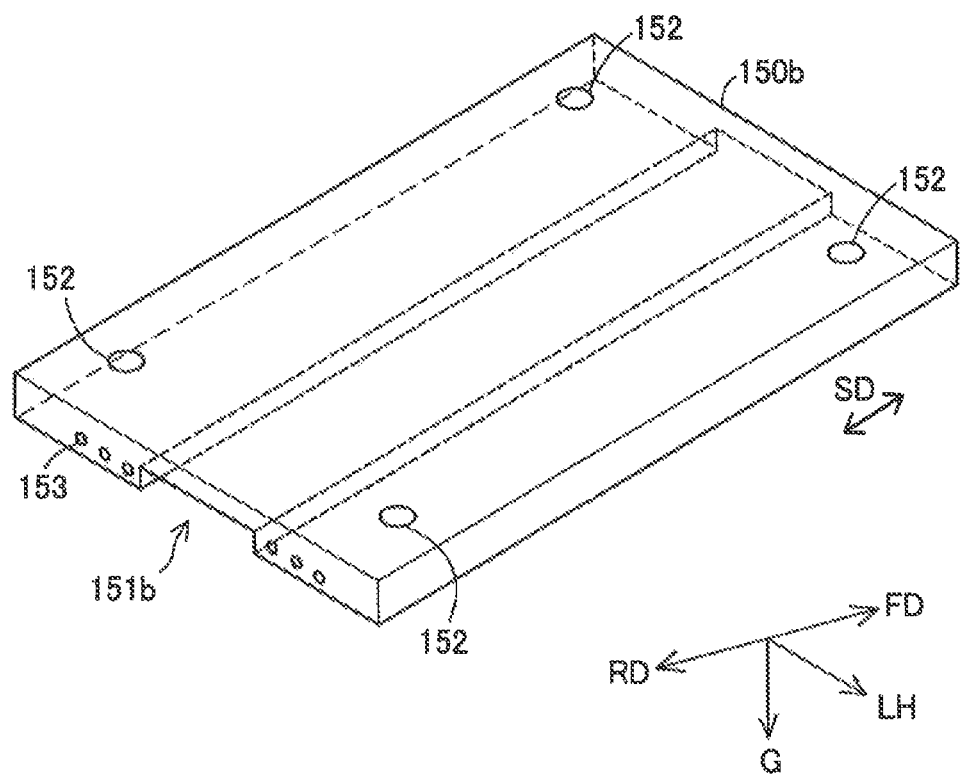

FUEL CELL VEHICLE

CROSS-REFERENCE TO RELATED APPLICATIONS

The present application claims priority based on Japanese patent application No. 2016-214855 filed on Nov. 2, 2016, the disclosure of which is hereby incorporated by reference in its entirety.

BACKGROUND

Field

The present disclosure relates to a fuel cell vehicle equipped with a fuel cell.

Related Art

In a proposed configuration of a fuel cell vehicle, a fuel cell module including a fuel cell stack is placed in a placement chamber provided in front of a passenger compartment, and a tank for storing hydrogen gas is placed in a hydrogen tank chamber provided under a floor of the passenger compartment (as described in JP 2015-231319A). In the fuel cell vehicle of JP 2016-231319A, the fuel cell stack is mounted to a suspension member via a mounting component. This mounting component is destroyed in the event of a collision, so as to allow the fuel cell stack to be moved into a retreat space below the hydrogen tank chamber and thereby avoid a collision between the fuel cell stack and the tank.

In the fuel cell vehicle of JP2015-231319A, the fuel cell stack and the tank are arranged to overlap with each other when being viewed in the horizontal direction. When the fuel cell stack moves in a horizontal direction by the impact of a collision or when the tank moves forward by the inertia force without destruction of the mounting component in the event of a collision, the fuel cell stack is likely to collide with the tank and damage the tank. This problem is not characteristic of the fuel cell stack but may arise in a configuration that any other component of the fuel cell module is arranged to overlap with the tank when being viewed in the horizontal direction. There is accordingly a need for a technique that suppresses a collision between the fuel cell module and the tank in the event of a collision of the fuel cell vehicle.

SUMMARY

According to one aspect of the disclosure, there is provided a fuel cell vehicle. This fuel cell vehicle comprises a fuel cell module configured to include a fuel cell stack, a tank configured to store a gas that is supplied to the fuel cell stack, a fuel cell placement chamber configured to place the fuel cell module therein and a tank placement chamber formed on a tear side of the fuel cell placement chamber in a vehicle longitudinal direction of the fuel cell vehicle under a floor of the fuel cell vehicle and configured to place the tank therein. The fuel cell module is placed vertically above the tank such as not to overlap with the tank when being viewed in the vehicle longitudinal direction. In the fuel cell vehicle of this aspect, the fuel cell module is placed vertically above the tank such as not to overlap with the tank when being viewed in the vehicle longitudinal direction. This configuration suppresses a collision between the fuel cell module and the tank even when the fuel cell module moves along the vehicle longitudinal direction toward the tank or when the tank moves along the vehicle longitudinal direction toward the fuel cell module by the inertia force in the event of a collision of the fuel cell vehicle.

BRIEF DESCRIPTION OF DRAWINGS

FIG. 9 is a sectional view illustrating the schematic configuration of a fuel cell vehicle according to a third embodiment; and FIG. 10 is a perspective view illustrating the schematic configuration of a supporting frame according to the third embodiment.

DESCRIPTION OF EMBODIMENTS

A. First Embodiment

A1. General Configuration of Vehicle

Figure 1:
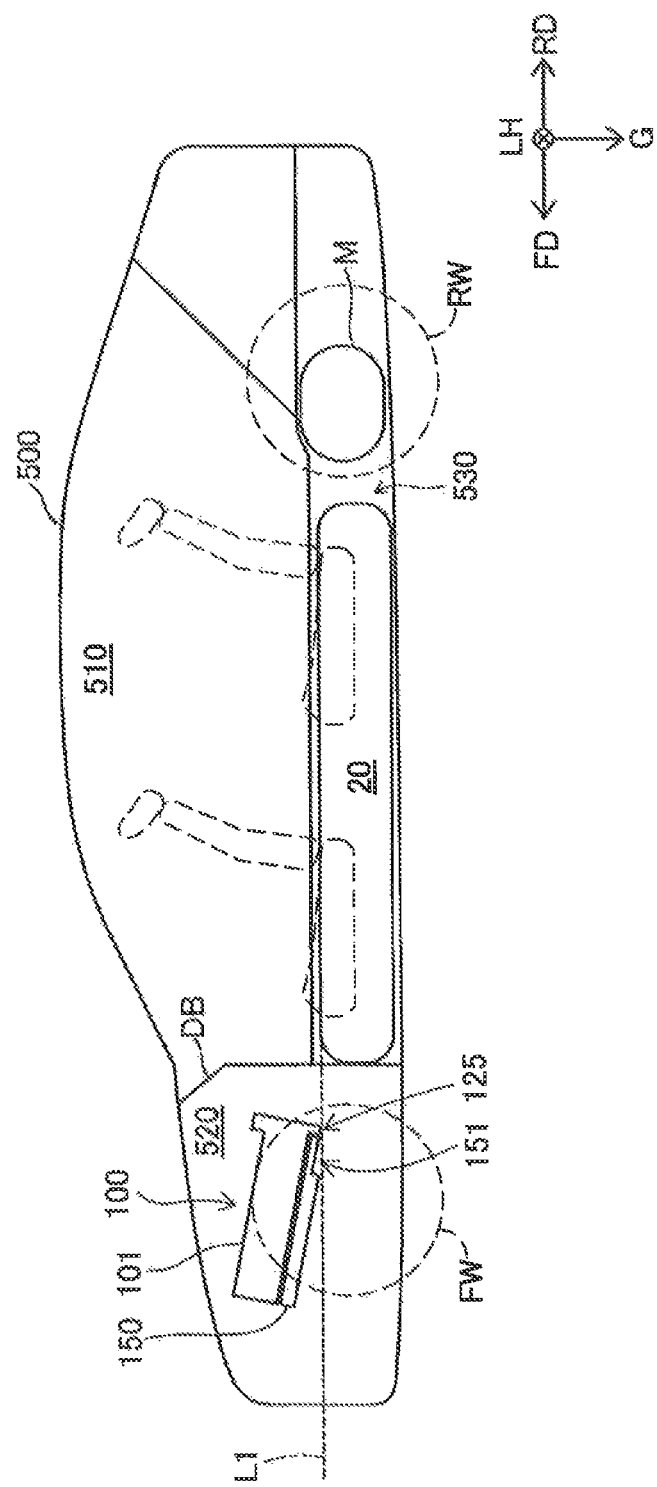
FIG. 1 is a sectional view illustrating the schematic configuration of a fuel cell vehicle according to one embodiment of the disclosure.

FIG. 1 is a sectional view illustrating the schematic configuration of a fuel cell vehicle 500 according to one embodiment of the disclosure. FIG. 1 illustrates a section along a forward direction FD and a rearward direction RD of the vehicle at the middle position in a vehicle width direction LH of the fuel cell vehicle 500 in a normal state without a collision. Hereinafter, the forward direction FD and the rearward direction RD are collectively referred as "vehicle longitudinal direction". The fuel cell vehicle 500 is equipped with a fuel cell module 100 as a power source and is configured such that rear wheels RW are driven by driving a motor M as a driving source. The direction of gravity, i.e., a vertically downward direction G, is shown in FIG. 1, in addition to the vehicle width direction LH, the forward direction FD, and the rearward direction RD. The reference signs and arrows indicating the respective directions in FIG. 1 correspond to the reference signs and arrows indicating the respective directions in the other drawings.

The fuel cell vehicle 500 is configured to form a passenger compartment 510, a fuel cell placement chamber 520, and a tank placement chamber 530.

The passenger compartment 510 is a room for passengers and is equipped with a plurality of seats as shown by broken lines in FIG. 1. The passenger compartment 510 is practically located in a region between a pair of front wheels FW and a pair of rare wheels RW.

The fuel cell placement chamber 520 is configured to place at least part of components of a fuel cell system (fuel cell system 200 described later) including the fuel cell module 100 therein. The fuel cell module 100 includes a fuel cell stack 101 and a supporting frame 150. The fuel cell module 100 further includes a case (case 130 described later) as described below, although the case is omitted from the illustration of FIG. 1. The fuel cell stack 101 has a stacked body including a plurality of stacked unit cells (unit cells 11 described later). The supporting frame 150 is a plate-like member configured to support the fuel cell stack 101 from below. The detailed configuration of the fuel cell module 100 including the fuel cell stack 101 and the supporting frame 150 will be described later. The fuel cell placement chamber 520 is located on the forward direction FD-side of the passenger compartment 510. The passenger compartment 510 and the fuel cell placement chamber 520 are separated from each other by a dashboard DB. The dashboard DB is a plate-like member configured such that an upper side portion is bent forward. A lower side portion of the dashboard DB is arranged to be approximately parallel to the vertical direction.

The tank placement chamber 530 is configured to place a tank 20 for storing hydrogen gas therein. The tank placement chamber 530 is formed on the rearward direction RD-side of the fuel cell placement chamber 520 under a floor of the fuel cell vehicle 500. The tank placement chamber 530 is also formed along with the vehicle longitudinal direction at the approximate center in the vehicle width direction LH. The tank placement chamber 530 has a ceiling portion that is formed by a floor panel of the passenger compartment 510. Part of the floor of the passenger compartment 510 corresponding to the tank placement chamber 530 is protruded vertically upward from the remaining part of the floor. The tank placement chamber 530 has a structure similar to the center tunnel where a driveshaft is placed in a vehicle equipped with an engine. The tank placement chamber 530 is configured to place a wire harness and the like (not shown) therein, in addition to the tank 20.

As shown in FIG. 1, the fuel cell module 100 placed in the fuel cell placement chamber 520 is arranged to be inclined downward toward the tank 20 in the vehicle longitudinal direction. In other words, the fuel cell module 100 is arranged to be inclined to the horizontal direction such as to be placed at the lower position toward the rearward direction RD. The reason for such inclined arrangement of the fuel cell module 100 is to cause water in the fuel cell stack 101 to be collected in the rearward direction RD by use of the gravity and to be readily discharged from the fuel cell stack 101.

As illustrated, a first recess 151 is formed in a vertically lower surface of the supporting frame 150. A second recess 125 is formed in an end plate (end plate 120 described later) included in the fuel cell stack 101. The detailed structures of the first recess 151 and the second recess 125 will be described later.

The fuel cell module 100 is placed vertically above the tank 20 such as not to overlap with the tank 20 when being viewed in the vehicle longitudinal direction. In other words, any part of a lowermost surface of the fuel cell module 100 is located vertically above a corresponding part in the vertical direction of an uppermost surface of the tank 20 when being viewed in the vehicle longitudinal direction. The above state that "the fuel cell module 100 is placed vertically above the tank 20" means that the uppermost portion in the vertical direction of the fuel cell module 100 is arranged vertically above the uppermost portion in the vertical direction of the tank 20. In FIG. 1, a virtual line L1 that passes through the uppermost portion in the vertical direction of the tank 20 and is parallel to a horizontal plane is drawn by the broken line. This virtual line L1 corresponds to a trajectory of the uppermost portion of the tank 20 assumed in the event of a collision. The uppermost portion of the fuel cell module 100 is located vertically above this virtual line L1.

A2. Configuration of Fuel Cell System

Figure 2:
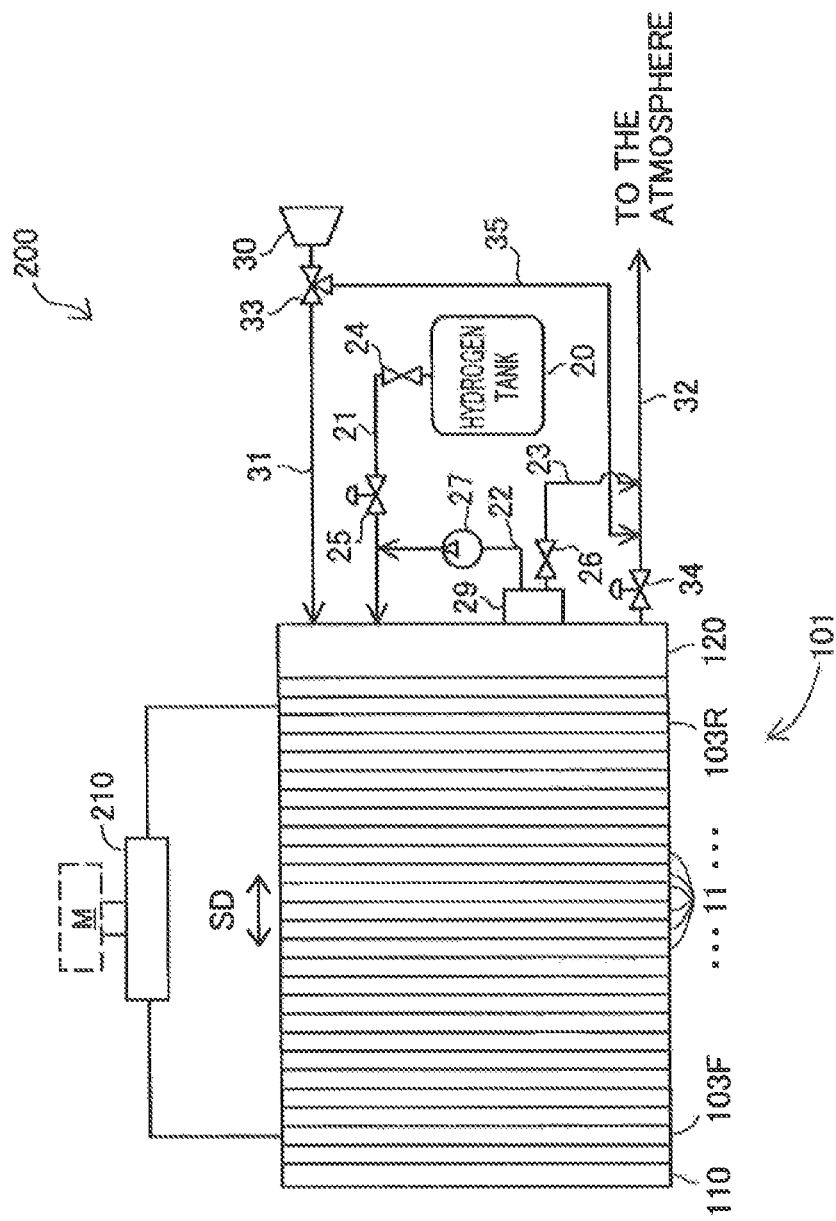
FIG. 2 is a block diagram illustrating the schematic configuration of a fuel cell system mounted on the fuel cell vehicle.

FIG. 2 is a block diagram illustrating the schematic configuration of a fuel cell system 200 mounted on the fuel cell vehicle 500. The fuel cell system 200 includes a gas-liquid separator 29, the tank 20, an air compressor 30, a shut-off valve 24, an injector 25, an exhaust drainage valve 26, a circulating pump 27, a three-way valve 33, a pressure regulating valve 34, a fuel gas supply path 21, a fuel gas circulation path 22, a fuel gas discharge path 23, an oxidant gas supply path 31, an oxidant gas discharge path 32, a bypass flow path 35 and a DC-DC converter 210, in addition to the fuel cell stack 101 described above. The fuel cell system 200 further includes a mechanism configured to circulate a cooling medium through the fuel cell stack 101, although not being illustrated.

The fuel cell stack 101 includes a plurality of stacked unit cells 11 and a pair of end plates 110 and 120 provided at the respective ends in the stacking direction. Each unit cell 11 is a polymer electrolyte fuel cell configured to generate electric power by an electrochemical reaction between a fuel gas and an oxidant gas that are respectively supplied to an anode-side catalyst electrode layer and to a cathode-side catalyst electrode layer provided across a solid polymer electrolyte membrane. According to the first embodiment, the fuel gas is hydrogen gas, and the oxidant gas is the air. The fuel cell stack 101 is arranged such that the end plate 110 is located on the forward direction FD-side and the end plate 120 is located on the rearward direction RD-side. The catalyst electrode layer is configured to include carbon particles with a catalyst such as platinum (Pt) supported thereon and an electrolyte. Gas diffusion layers made of a porous material are placed outside of the catalyst electrode layers on the respective electrode sides in the unit cell 11. The porous material may be, for example, porous carbon such as carbon paper or carbon cloth or porous metal such as metal mesh or foamed metal. Manifolds (not shown) for the fuel gas, the oxidant gas and the cooling medium are formed along a stacking direction SD of the unit cells 11 inside of the fuel cell stack 101. The unit cell 11 may not be necessarily limited to the polymer electrolyte fuel cell but may be any other type of fuel cell such as solid oxide fuel cell.

The pair of end plates 110 and 120 serve to place the stacked body including the plurality of unit cells 11 therebetween. In the pair of end plates 110 and 120, the end plate 120 has a function of providing flow paths for supplying and discharging the fuel gas, the oxidant gas, and the cooling medium to and from the manifolds formed in the fuel cell stack 101. The end plate 110, on the other hand, does not have such a function. Both the end plate 110 and the end plate 120 have approximately plate-like external shapes with their thickness directions aligned with the stacking direction SD.

The tank 20 is configured to store high-pressure hydrogen and supply hydrogen gas as the fuel gas to the fuel cell stack 101 through the fuel gas supply path 21. As shown in FIG. 1, the tank 20 has an approximately cylindrical external shape and is placed in the tank placement chamber 530 such that its longitudinal direction is aligned with the vehicle longitudinal direction. The circulating pump 27 is placed in the fuel gas circulation path 22 and is configured to feed the fuel gas (fuel gas after separation of water) discharged from the gas-liquid separator 29 to the fuel gas supply path 21. The shut-off valve 24 is placed in the vicinity of a fuel gas discharge port of the tank 20 and is configured to change over between the supply and the stop of hydrogen gas from the tank 20. The injector 25 is placed in the fuel gas supply path 21 and is configured to regulate the supply amount (flow rate) and the pressure of hydrogen gas supplied to the fuel cell stack 101. The gas-liquid separator 29 is connected with the fuel gas discharge manifold in the fuel cell stack 101 and is configured to separate and discharge water included in an off-gas discharged from this manifold and to discharge a gas (fuel gas) after separation of water. The exhaust drainage valve 26 is placed in the fuel gas discharge path 23 and is configured to change over between the discharge and the stop of water and the off-gas from the gas-liquid separator 29. The air compressor 30 is configured to supply the air as the oxidant gas to the fuel cell stack 101. The three-way valve 33 is placed in the oxidant gas supply path 31 and is configured to regulate the amount of the air to be supplied to the oxidant gas supply path 31 and the amount of the air to be supplied to the bypass flow path 35 in the total amount of the air supplied from the air compressor 30. The pressure regulating valve 34 is placed in the oxidant gas discharge path 32 and is configured to regulate the pressure on the cathode discharge side (back pressure) in the fuel cell stack 101.

The following describes the flow of the fuel gas in the fuel cell system 200. The hydrogen gas fed from the tank 20 is supplied to the fuel cell stack 101 through the fuel gas supply path 21. The off-gas (anode-side off-gas) discharged from the fuel cell stack 101 is supplied to the gas-liquid separator 29, which separates at least part of water included in the off-gas. The off-gas after separation of water (i.e., fuel gas) is recirculated to the fuel gas supply path 21 through the fuel gas circulation path 22 and the circulating pump 27 and is again supplied to the fuel cell stack 101. Part of the off-gas supplied to the gas-liquid separator 29 is discharged from the gas-liquid separator 29 to the fuel gas discharge path 23 through the exhaust drainage valve 26, in addition to the water separated from the off-gas. The fuel gas discharge path 23 is connected with the oxidant gas discharge path 32, and the water and the anode-side off-gas discharged to the fuel gas discharge path 23 are discharged to the atmosphere through the oxidant gas discharge path 32, along with the water and the cathode-side off-gas discharged from the fuel cell stack 101. The fuel gas discharge path 23 communicates with the oxidant gas discharge path 32 that is open to the atmosphere, while a back pressure higher than the atmospheric pressure is applied to inside of the gas-liquid separator 29. There is accordingly a pressure difference across the exhaust drainage valve 26. When the exhaust drainage valve 26 is opened, the off-gas is discharged from the gas-liquid separator 29 to the fuel gas discharge path 23 by the above pressure difference.

The following describes the flow of the oxidant gas in the fuel cell system 200. The air (compressed air) fed from the air compressor 30 is supplied to the fuel cell stack 101 through the oxidant gas supply path 31. The amount of the air supplied to the fuel cell stack 101 is regulated by adjusting the position of the three-way valve 33. The off-gas (cathode-side off-gas) and the water discharged from the fuel cell stack 101 are discharged to the oxidant gas discharge path 32 via the pressure regulating valve 34. The oxidant gas discharge path 32 is connected with the fuel gas discharge path 23 as described above and is also connected with the bypass flow path 35. The cathode-side off-gas discharged from the fuel cell stack 101 is discharged to the atmosphere, along with the anode-side off-gas and the water discharged through the fuel gas discharge path 23 and the air discharged through the bypass flow path 35.

The fuel cell stack 101 is arranged to be inclined to the horizontal direction such as to be placed at the lower position toward the rearward direction RD as described above, so that the end plate 120 is located at the lowermost position in the vertically downward direction G in the fuel cell stack 101. This configuration causes the water in the fuel cell stack 101 to move through the respective manifolds toward the end plate 120 by the gravity and accelerates drainage of water from the fuel cell stack 101.

A pair of current collectors 103F and 103R in the fuel cell stack 101 are electrically connected with the DC-DC converter 210. The DC-DC converter 210 is electrically connected with the motor M and is configured to boost the output voltage of the fuel cell stack 101 and supply the boosted voltage to the motor M.

The operations of the exhaust drainage valve 26, the air compressor 30, the circulation pump 27, and the other respective valves described above are controlled by a controller (not shown). This controller may be configured to include a ROM (Read Only Memory) that stores control programs, a CPU (Central Processing Unit) that reads out the control programs from the ROM and executes the control programs, and a RAM (Random Access Memory) that is used as a work area of the CPU.

A3. Configuration of Fuel Cell Module

Figure 3:
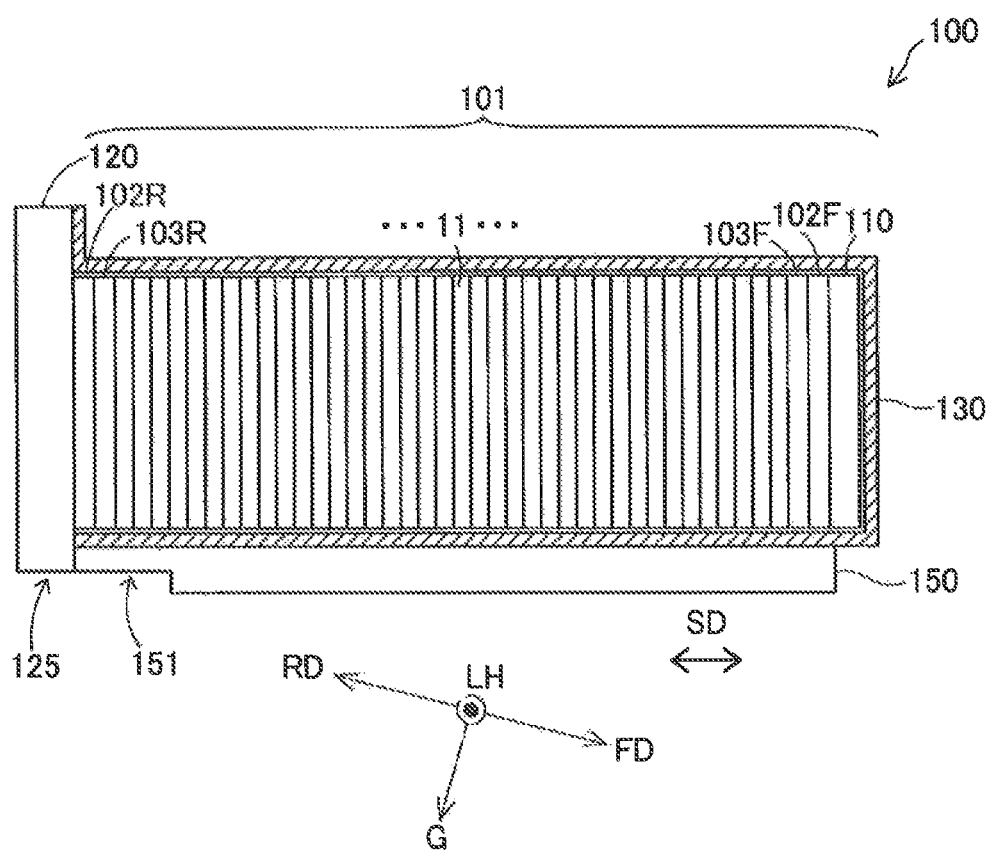
FIG. 3 is a sectional view illustrating the schematic configuration of a fuel cell module.

FIG. 3 is a sectional view illustrating the schematic configuration of the fuel cell module 100. FIG. 3 illustrates a section of the fuel cell module 100 at a position similar to that of FIG. 1. The fuel cell module 100 includes a case 130, in addition to the fuel cell stack 101 described above and the supporting frame 150.

The fuel cell stack 101 is configured to include a pair of insulating plates 102F and 102R, in addition to the plurality of stacked unit cells 11, the pair of end plates 110 and 120 and the pair of current collectors 103F and 103R described above. The pair of current collectors 103F and 103R serve as the overall electrodes. The current collector 103F is placed on the forward direction FD-side of the forward-most unit cell 11 among the plurality of unit cells 11 to adjoin to this forward-most unit cell 11. The current collector 103R is placed on the rearward direction RD-side of the rearward-most unit cell 11 among the plurality of unit cells 11 to adjoin to this rearward-most unit cell 11. The pair of insulating plates 102F and 102F are plate-like members made of an insulating material. The insulating plate 102F is placed between the end plate 110 and the current collector 103F to suppress the electrical connection between the end plate 110 and the current collector 103F. The insulating plate 102R is placed between the end plate 120 and the current collector 103R to suppress the electrical connection between the end plate 120 and the current collector 103R.

The case 130 is configured to place the remaining part of the fuel cell stack 101 other than the end plate 120 therein. In other words, the fuel cell stack 101 with the end plate 120 exposed is placed in the case 130. According to the first embodiment, the case 130 is made of aluminum (Al). The material of the case 130 is, however, not limited to aluminum but may be stainless steel (SUS), titanium (Ti) or any of metal alloys thereof. The material of the case 130 is also not limited to the metal but may be a resin or the like. The lowermost portion of the end plate 120 is located below the lowermost portion of the case 130 in the vertically downward direction G as shown in FIG. 3.

Figure 4:
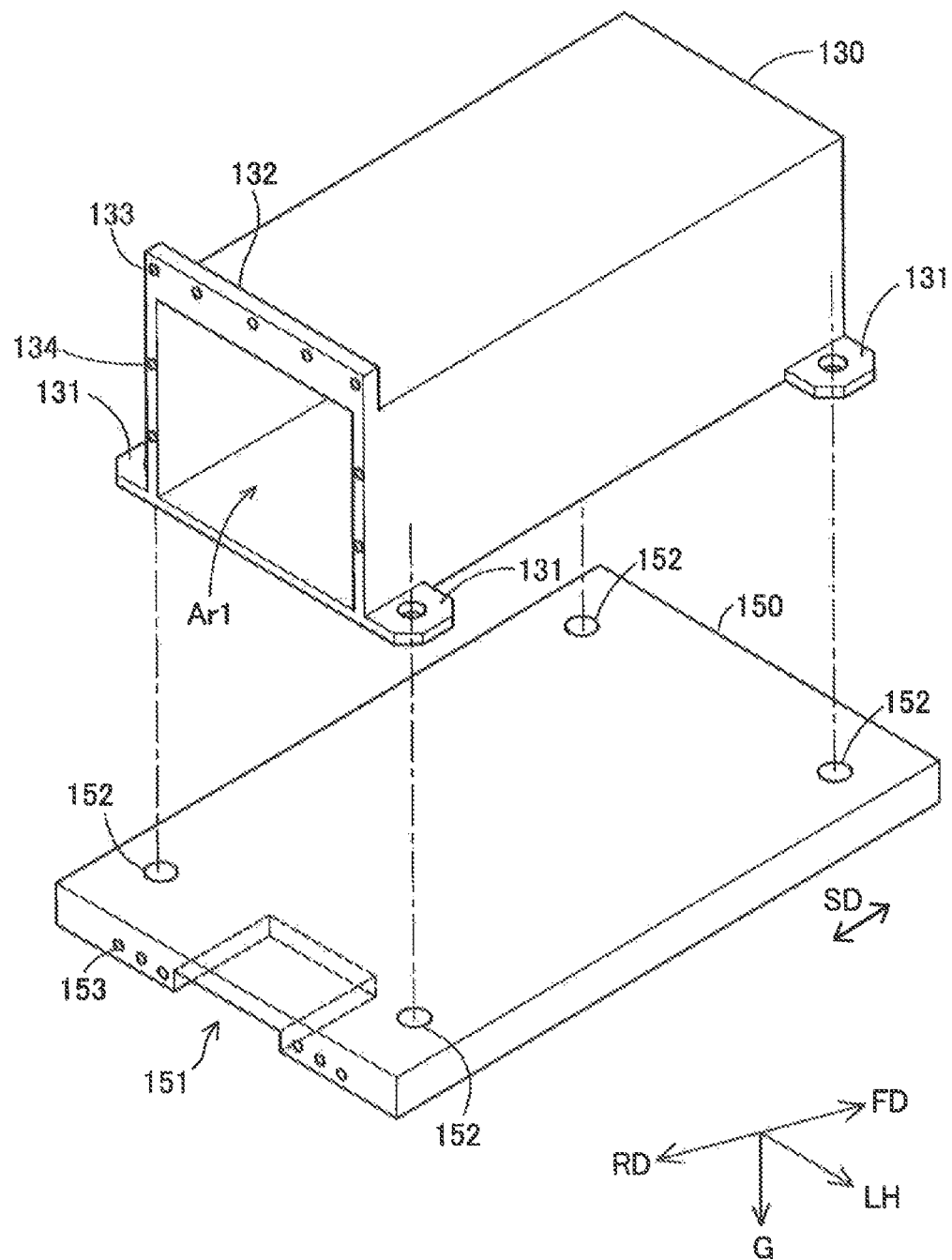
FIG. 4 is a perspective view illustrating the configuration of a case and a supporting frame.

FIG. 4 is a perspective view illustrating the configuration of the case 130 and the supporting frame 150. In FIG. 4, the upper side shows an external perspective view of the case 130, and the lower side shows an external perspective view of the supporting frame 150.

As shown in FIG. 4, the case 130 has a tubular external shape that is open at an end on the rearward direction RD-side and is hollow inside. The remaining part of the fuel cell stack 101 other than the end plate 120 is placed in an inner space Ar1 of the case 130. Fixing elements 131 are formed at four corners on the bottom of the case 130. The fixing element 131 is protruded in the horizontal direction and has a through hole that is formed at the center portion to pass through in the thickness direction. A flange portion 132 that is folded upward is formed at a rearward direction RD-side end of the case 130. A plurality of threaded holes 133 extended in the thickness direction are formed in the flange portion 132. A plurality of threaded holes 134 extended in the stacking direction are formed in an end face (portion including the opening) on the rearward direction RD-side of the case 130. These threaded holes 133 and 134 are formed as female threads.

As shown in FIG. 4, the supporting frame 150 has a plate-like external shape and has threaded holes 152 that are formed at four corners. These threaded holes 152 are formed at the positions corresponding to the through holes of the four fixing elements 131 of the case 130 described above. The respective threaded holes 152 are formed as female threads. The case 130 is placed on an upper face of the supporting frame 150 and is joined with the supporting frame 150 by screwing male screws (not shown) inserted via the through holes of the fixing elements 131 with the threaded holes 152 of the supporting frame 150. A plurality of threaded holes 153 are formed in an end face on the rearward direction RD-side of the supporting frame 150. The plurality of these threaded holes 153 are used to join the supporting frame 150 with the end plate 120 as described later. The supporting frame 150 is provided with a mount portion (not shown) and is attached to a suspension member (not shown) by this mount portion. This suspension member is placed in the fuel cell placement chamber 520 and is joined with a body frame (not shown). According to a modification, the supporting frame 150 may be directly attached to the body frame (not shown) without using the suspension member.

The first recess 151 is formed on a vertically downward direction G-side surface of the supporting frame 150. The first recess 151 is formed in the supporting frame 150 in a region corresponding to the upper portion of the tank 20 in the vertical direction when being viewed from the vehicle longitudinal direction. In other words, the first recess 151 is arranged on the rearward direction RD-side end and at the approximate center in the vehicle width direction LH in the vertically downward direction G-side surface of the supporting frame 150. The first recess 151 is open at least in the vertically downward direction G and in the rearward direction RD and has a smaller thickness than the other part of the supporting frame 150. The first recess 151, however, has a non-zero thickness and is thus not formed as a cutout. The first recess 151 is unrecognizable when the supporting frame 150 is viewed from above. The non-zero thickness of the first recess 151 suppresses reduction in rigidity of the supporting frame 150. According to the first embodiment, the planar view shape of the first recess 151 or more specifically the planar view shape of the first recess 151 viewed from below is an approximately rectangular shape. The first recess 151 is accordingly formed as a cavity in an approximately rectangular parallelepiped shape. The shape of the first recess 151 viewed in the forward direction FD is also an approximately rectangular shape.

Figure 5:
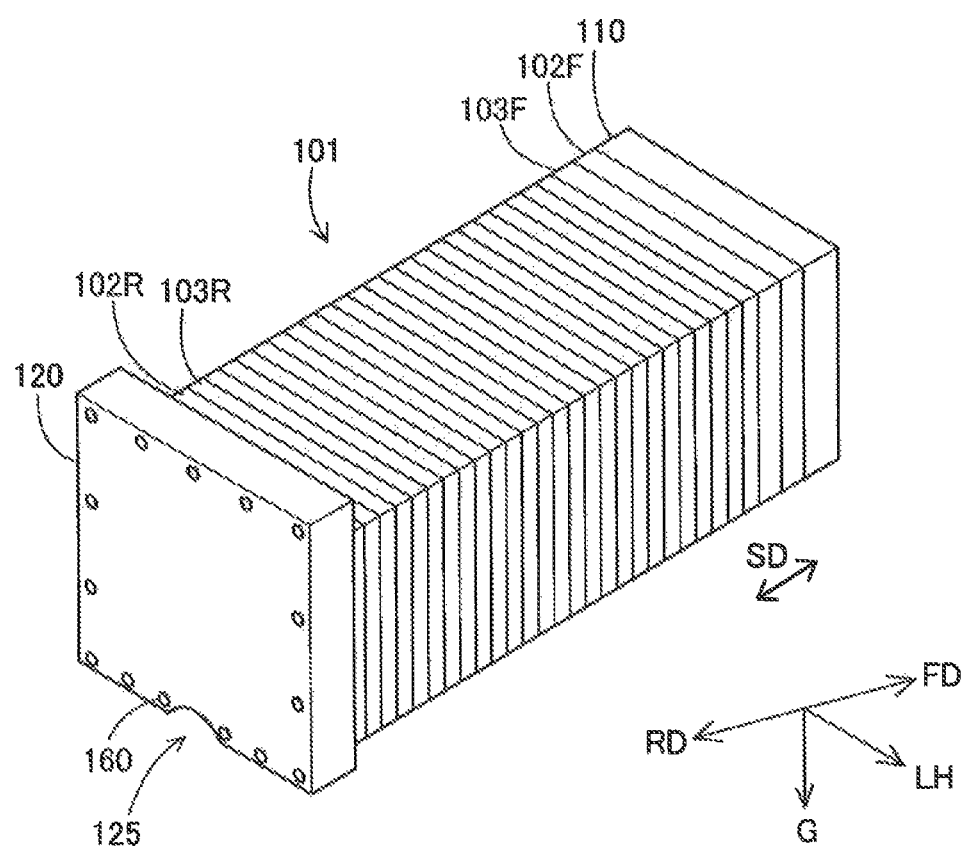
FIG. 5 is a perspective view illustrating the schematic configuration of a fuel cell stack.
Figure 6:
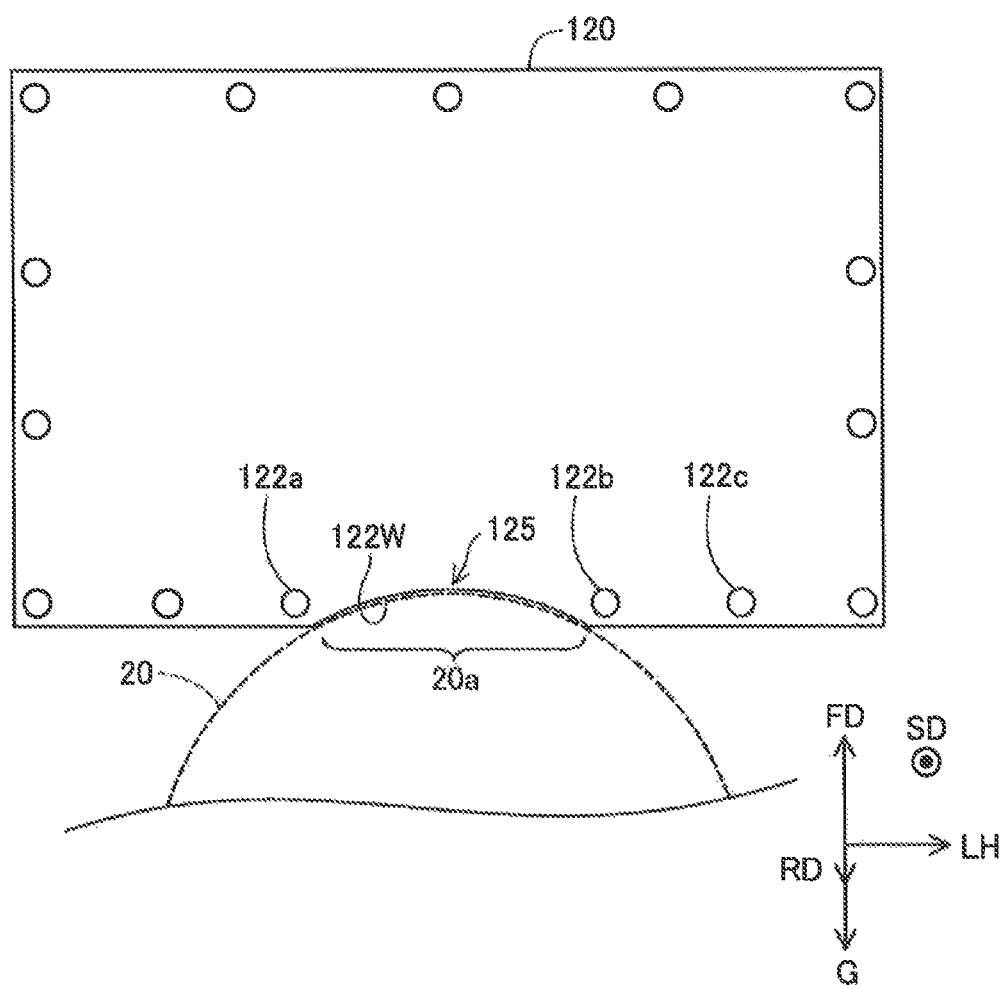
FIG. 6 is a front view illustrating an end plate.

FIG. 5 is a perspective view illustrating the schematic configuration of the fuel cell stack 101. FIG. 6 is a front view illustrating the end plate 120. FIG. 6 shows a front view of the end plate 120 viewed in the forward direction FD. Screws (screws 160 described later) used to attach the end plate 120 to the case 130 and the supporting frame 150 are omitted from the illustration of FIG. 6. In FIG. 6, the outline of the tank 20 viewed in the forward direction FD is shown by the broken line.

As shown in FIG. 6, a plurality of threaded holes are formed in the vicinity of the outer edge of the end plate 120. The plurality of these threaded holes include three threaded holes 122a, 122b, and 122c arrayed in a location near to a vertically lower end face of the end plate 120. The two threaded holes 122a and 122b are arranged to adjoin to each other. The threaded hole 122c is arranged on the opposite side to the threaded hole 122a across the threaded hole 122b to adjoin to the threaded hole 122b. The two threaded holes 122a and 122b are located in an approximate center portion in the vehicle width direction LH of the end plate 120.

As shown in FIG. 6, the second recess 125 is formed as a cutout between the two threaded holes 122a and 122b. The second recess 125 is open at least in the vertically downward direction G and in the rearward direction RD. The second recess 125 is formed in a region of the end plate 120 that includes a rearward direction RD-side end of the end plate 120 and corresponds to an upper portion 20a of the tank 20 in the vertical direction when being viewed in the vehicle longitudinal direction. A wall surface 122W of the end plate 120 facing the second recess 125 has an arc planar view shape. This shape of the wall surface 122W is approximately identical with the planar view shape of part of an outer circumferential face of the upper portion 20a of the tank 20. In other words, the second recess 125 is formed such that the shape of the wall surface 122W conforms to the planar view shape of part of the outer circumferential face of the upper portion 20a of the tank 20. The wall surface 122W is, however, located slightly vertically above the outer circumferential face of the upper portion 20a of the tank 20. In other words, any part of the wall surface 122W is located slightly vertically above a corresponding part in the vertical direction on the outer circumferential face of the tank 20 when being viewed in the vehicle longitudinal direction. Accordingly, the wall surface 122W does not overlap with the upper portion 20a of the tank 20 when being viewed in the vehicle longitudinal direction.

According to the first embodiment, the distance between the two threaded holes 122a and 122b is longer than the distance of any two other adjacent threaded holes among the plurality of threaded holes arrayed in the location near to the vertically lower end face of the end plate 120. For example, the distance between the two threaded holes 122a and 122b is longer than the distance between the two threaded holes 122b and 122c. This configuration of the first embodiment increases the size of the second recess 125 by increasing the distance between the two threaded holes 122a and 122b arranged to adjoin to each other across a portion where the second recess 125 is formed.

As shown in FIG. 5, screws 160 are respectively inserted in the plurality of threaded holes formed in the vicinity of the outer edge of the end plate 120. The screws 160 are inserted into the plurality of threaded holes 133 and the plurality of threaded holes 134 formed in the case 130 shown in FIG. 4 and into the plurality of threaded holes 153 formed in the supporting frame 150 shown in FIG. 4 via the threaded holes formed in the end plate 120 and are screwed with the female threads provided in these threaded holes 133, 134 and 153. The end plate 120 is accordingly joined with the case 130 and with the supporting frame 150. The screw 160 corresponds to the subordinate concept of the clamping member in the claims.

A4. Motions in the Event of Collision

Figure 7:
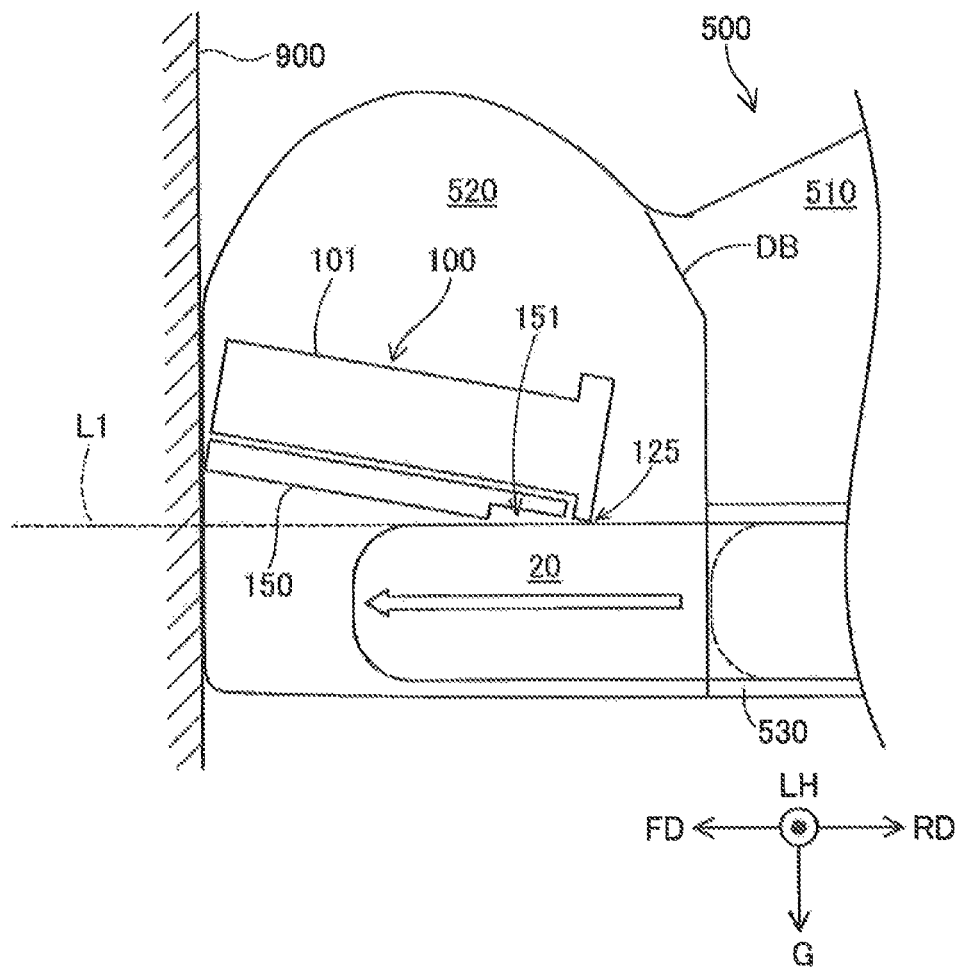
FIG. 7 is a sectional view illustrating the motions of the fuel cell stack, the supporting frame, and a tank in the event of a collision.

FIG. 7 is a sectional view illustrating the motions of the fuel cell stack 101, the supporting frame 150, and the tank 20 in the event of a collision. FIG. 7 shows a front portion of the fuel cell vehicle 500 in the event of a front collision with omission of a rear portion of the fuel cell vehicle 500. FIG. 7 shows a section of the fuel cell vehicle 500 at a position similar to that of FIG. 1. For convenience of illustration, the front wheels FW are omitted from the illustration of FIG. 7.

When the fuel cell vehicle 500 comes into collision with a collision object 900 ahead of the vehicle, the fuel cell module 100 collides with the collision object 900 via the vehicle body (for example, hood and radiator grille) to stop its forward move. At this time, the tank 20 has not yet collided with the collision object 900 via the vehicle body and other components and accordingly tends to move forward by the inertia force. The tank 20 is thrusted in the forward direction FD from the tank placement chamber 530. The fuel cell module 100 is, however, placed vertically above the tank 20 such as not to overlap with the tank 20 when being viewed in the vehicle longitudinal direction as described above. Even when the tank 20 is thrusted in the forward direction FD, the fuel cell module 100 accordingly does not collide with the tank 20. This configuration thus suppresses the tank 20 from being damaged in the event of a collision.

The example of collision shown in FIG. 7 illustrates an example that stops the fuel cell module 100 from moving forward while moving the tank 20 in the forward direction FD. The configuration of the embodiment similarly suppresses the tank 20 from being damaged in the case of another example of collision. For example, when the fuel cell module 100 moves in the forward direction FD at a speed lower than the speed of the tank 20 that moves forward or when the fuel cell module 100 moves in the rearward direction RD as the reaction of a collision of the fuel cell module 100 with the vehicle body, the fuel cell module 100 does not collide with the tank 20. This accordingly suppresses the tank 20 from being damaged. Even when at least one of the fuel cell module 100 and the tank 20 is moved by a collision of the fuel cell vehicle 500 and the fuel cell module 100 and the tank 20 come close to each other, the configuration of the embodiment suppresses a collision between the fuel cell module 100 and the tank 20 and thereby suppresses the tank 20 from being damaged.

In the fuel cell vehicle 500 of the first embodiment described above, the fuel cell module 100 is placed vertically above the tank 20 such as not to overlap with the tank 20 when being viewed in the vehicle longitudinal direction. This configuration suppresses a collision between the fuel cell module 100 and the tank 20 even when the fuel cell module 100 moves in the rearward direction RD or when the tank 20 moves in the forward direction FD by the inertia force in the event of a collision of the fuel cell vehicle 500.

In the fuel cell vehicle 500 of the first embodiment, the first recess 151 is formed in the supporting frame 150. Even when the fuel cell module 100 and the tank 20 move relative to each other such that the upper portion of the tank 20 in the vertical direction approaches to the first recess 151 in the event of a collision of the fuel cell vehicle 500, this configuration causes the upper portion of the tank 20 in the vertical direction to be located (placed) below the first recess 151 and thereby suppresses a collision between the fuel cell module 100 and the tank 20. This configuration suppresses a collision between the fuel cell module 100 and the tank 20 in the event of a collision of the fuel cell vehicle 500 even when the fuel cell module 100 is placed at the lower position in the vertically downward direction G, compared with a configuration without the first recess 151 formed in the supporting frame 150. The configuration that enables the fuel cell module 100 to be placed at the lower position in the vertically downward direction G may reduce the height of the fuel cell placement chamber 520 to achieve downsizing of the fuel cell vehicle 500 or may increase the space for placing the components other than the fuel cell module 100 in the fuel cell placement chamber 520 while keeping the height of the fuel cell placement chamber 520 unchanged. The configuration that enables the fuel cell module 100 to be placed at the lower position in the vertically downward direction G can lower the overall center of gravity of the components placed in the fuel cell placement chamber 520 and improve the driving stability.

In the fuel cell vehicle 500 of the first embodiment, the second recess 125 is formed in the end plate 120. Even when the fuel cell module 100 and the tank 20 move relative to each other such that the upper portion of the tank 20 in the vertical direction approaches toward the second recess 125 in the event of a collision of the fuel cell vehicle 500, this configuration causes the upper portion of the tank 20 to be located (placed) below the second recess 125 and thereby suppresses a collision between the fuel cell module 100 and the tank 20. This configuration suppresses a collision between the end plate 120 and the tank 20 in the event of a collision of the fuel cell vehicle 500 even when the end plate 120 is placed at the lower position in the vertically downward direction G, compared with a configuration without the second recess 125 formed in the end plate 120. The configuration that enables the end plate 120 to be placed at the lower position in the vertically downward direction G may reduce the height of the fuel cell placement chamber 520 to achieve downsizing of the fuel cell vehicle 500. The configuration that enables the end plate 120 to be placed at the lower position in the vertically downward direction G can lower the overall center of gravity of the components placed in the fuel cell placement chamber 520 and improve the driving stability.

In the fuel cell vehicle 500 of the first embodiment, the second recess 125 is formed between the two threaded holes 122a and 122b that are arranged adjacent to each other in the vehicle width direction LH to receive the screws 160 respectively. This configuration enables the end plate 120 to be firmly joined with the case 130 and to be firmly joined with the supporting frame 150, while providing the second recess 125. Additionally, the distance between the two threaded holes 122a and 122b arranged adjacent to each other across the portion where the second recess 125 is formed is longer than the distance between any two other adjacent threaded holes among the plurality of threaded holes arrayed in the location near to the vertically lower end face of the end plate 120. This configuration may increase the distance between the two threaded holes 122a and 122b and increase the size of the second recess 125.

In the fuel cell vehicle 500 of the first embodiment, the fuel cell stack 101 is arranged to be inclined downward toward the tank 20 in the vehicle longitudinal direction. This configuration causes water in the fuel cell stack 101 to be moved toward the tank 20 (in the rearward direction RD) by use of the gravity and to be readily discharged from the fuel cell stack 101.

In the fuel cell vehicle 500 of the first embodiment, the tank placement chamber 530 is configured to place the tank 20 therein such that the longitudinal direction of the tank 20 is aligned with the vehicle longitudinal direction. This configuration enables a larger tank to be placed in the tank placement chamber 530, compared with a configuration that places the tank 20 such that the longitudinal direction of the tank 20 is aligned with the vehicle width direction LH.

B. Second Embodiment

Figure 8:
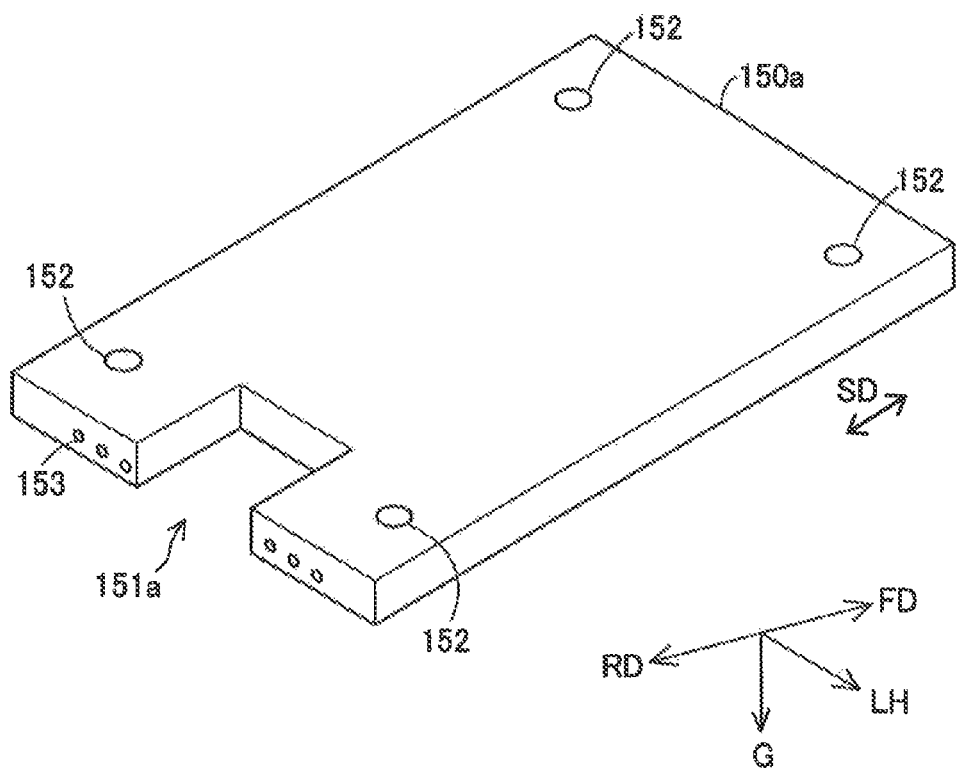
FIG. 8 is a perspective view illustrating the schematic configuration of a supporting frame according to a second embodiment.

FIG. 8 is a perspective view illustrating the schematic configuration of a supporting frame 150a according to a second embodiment. A fuel cell vehicle of the second embodiment differs from the fuel cell vehicle 500 of the first embodiment by the supporting frame 150a provided in place of the supporting frame 150. The other configuration of the fuel cell vehicle of the second embodiment is similar to that of the fuel cell vehicle 500 of the first embodiment.

The supporting frame 150a of the second embodiment differs from the supporting frame 150 of the first embodiment by a first recess 151a provided in place of the first recess 151. The other configuration of the supporting frame 150a of the second embodiment is similar to the configuration of the supporting frame 150 of the first embodiment. Like components are expressed by like reference signs, and their detailed description is omitted.

The first recess 151a of the supporting frame 150a is configured as a cutout formed in the thickness direction of the supporting frame 151a. The planar view shape and the planar view area (shape and area viewed from above or from below) of the first recess 151a are identical with the planar view shape and the planar view area of the first recess 161 of the first embodiment. The supporting frame 150a is open at least in the vertically downward direction G, in the vertically upward direction, and in the rearward direction RD.

The fuel cell vehicle of the second embodiment having the above configuration has similar advantageous effects to those of the fuel cell vehicle 500 of the first embodiment. Additionally, the first recess 151a of the second embodiment is configured as a cutout in the thickness direction of the supporting frame 150a. The first recess 151a of this configuration more reliably suppresses a collision between the supporting frame 150a and the tank 20 in the event of a collision, compared with the first recess configured not as a cutout. This accordingly enables the supporting frame 150a and the fuel cell stack 101 to be placed at the lower position in the vertically downward direction G.

C. Third Embodiment

FIG. 9 is a sectional view illustrating the schematic configuration of a fuel cell vehicle 500b according to a third embodiment. FIG. 9 illustrates a section along the forward direction FD and the rearward direction RD of the vehicle at the middle position in the vehicle width direction LH of the fuel cell vehicle 500b in the normal state without a collision, like FIG. 1.

The fuel cell vehicle 500b of the third embodiment differs from the fuel cell vehicle 500 of the first embodiment by that a fuel cell module 100b is provided in place of the fuel cell module 100 and is arranged to be parallel to the horizontal direction. The other configuration of the fuel cell vehicle 500b of the third embodiment is similar to that of the fuel cell vehicle 500 of the first embodiment. Like components are expressed by like reference signs, and their detailed description is omitted. The fuel cell module 100b differs from the fuel cell module 100 of the first embodiment by a supporting frame 150b provided in place of the supporting frame 150. The other configuration of the fuel cell module 100b of the third embodiment is similar to that of the fuel cell module 100 of the first embodiment. Like components are expressed by like reference signs, and their detailed description is omitted.

The arrangement of the fuel cell module 100b to be parallel to the horizontal direction means arrangement of the fuel cell module 100b such that the stacking direction SD of the fuel cell stack 101 is parallel to the horizontal direction (vehicle longitudinal direction). In the fuel cell vehicle 500b of the third embodiment having this configuration, the fuel cell module 100b is placed vertically above the tank 20 such as not to overlap with the tank 20 when being viewed in the vehicle longitudinal direction.

FIG. 10 is a perspective view illustrating the schematic configuration of the supporting frame 150b according to the third embodiment. The supporting frame 150b of the third embodiment differs from the supporting frame 150 of the first embodiment by a first recess 151b provided in place of the first recess 151. The other configuration of the supporting frame 150b of the third embodiment is similar to that of the supporting frame 150 of the first embodiment. Like components are expressed by like reference signs, and their detailed description is omitted.

The first recess 151b of the third embodiment differs from the recess 151 of the first embodiment by that the first recess 151b is formed over the entre supporting frame 150b along the stacking direction SD. The planar view shape of the first recess 151b is a band-like external shape extended along the stacking direction SD. In other words, the first recess 151b is configured as a groove extended along the stacking direction SD. The first recess 151b is open at least in the vertically downward direction G, in the rearward direction RD, and in the forward direction FD.

The fuel cell vehicle 500b of the third embodiment having the above configuration has similar advantageous effects to those of the fuel cell vehicle 500 of the first embodiment. For example, the fuel cell module 100b of the third embodiment is placed vertically above the tank 20 such as not to overlap with the tank 20 when being viewed from the vehicle longitudinal direction. This configuration suppresses a collision between the fuel cell module 100b and the tank 20 even when the fuel cell module 100b moves in the rearward direction RD or when the tank 20 moves in the forward direction FD by the inertia force in the event of a collision.

D. Modifications

D1. Modification 1:

In the respective embodiments described above, the fuel cell module 100 or 100b is equipped with the supporting frame 150, 150a, or 150b. According to a modification, the supporting frame 160, 150a or 150b may be omitted. Even in this modification, the configuration that the end plate 120 includes the second recess 125 enables the fuel cell module 100 or 100b to be placed at the lower position in the vertically downward direction. In this modified configuration, the fuel cell module 100 or 100b may be fixed by attaching the case 130 to the suspension member, the body frame, or the like.

D2. Modification 2:

The first recess 151, 151a, or 151b may be omitted from the supporting frame 150, 150a, or 150b of each of the embodiments. Similarly, the second recess 125 may be omitted from the end plate 120. In these modification, the configuration that the fuel cell module 100 or 100b is placed vertically above the tank 20 such as not to overlap with the tank 20 when being viewed in the vehicle longitudinal direction suppresses a collision between the fuel cell module 100 or 100b and the tank 20 in the event of a collision. For example, in the configuration with omission of only the first recess 151, 151a or 151b out of the first recess 151, 151a or 151b and the second recess 125, at a large inclination angle of the fuel cell module, the tank 20 is allowed to move in the forward direction FD without a collision with the supporting frame 150, 150a or 150b even when the tank 20 passes below the end plate 120 (below the second recess 125) in the forward direction FD in the event of a collision. For example, both the first recess 151b and the second recess 125 may be omitted in the third embodiment.

D3. Modification 3:

In the respective embodiments described above, the end plate 120 is joined with the case 130 and with the supporting frame 150, 150a, or 150b by means of the screws 160. According to a modification, other arbitrary fastening members such as pins without threads may be used for such joining.

D4. Modification 4:

In the respective embodiments, the tank placement chamber 530 is configured to be extended in the vehicle longitudinal direction. The present disclosure is, however, not limited to this configuration. According to a modification, the tank placement chamber 530 may be configured to be extended in the vehicle width direction LH. In this modified configuration, even when the tank 20 kept sideways relatively moves in the forward direction FD in the event of a front collision, the presence of the second recess 126 and the first recess 151, 151a or 151b suppresses the tank 20 from hitting against the fuel cell module 100 or 100b. This modified configuration may increase the lengths of the second recess 125 and the first recess 151, 151a or 151b in the vehicle width direction LH. According to another modification, the tank placement chamber 530 may be arranged to be deviated from the approximate center in the vehicle width direction. This modified configuration provides similar advantageous effects to those of the respective embodiments by adjusting the position of the first recess 151, 151a or 151b in the supporting frame 150, 150a or 150b and adjusting the position of the second recess 125 in the end plate 120 to be aligned in the vehicle width direction LH with the position of the tank 20 placed in the tank placement chamber 530. The tank placement chamber 530 may be configured as a space extended in both the vehicle longitudinal direction and in the vehicle width direction LH. The tank 20 may be placed with any inclination in the tank placement chamber 530. Part of the front side of the tank 20 may be protruded into the fuel cell placement chamber 520.

D5. Modification 5:

In the respective embodiments, the second recess 125 of the end plate 120 is formed between the two threaded holes 122a and 122b in the approximately center portion in the vehicle width direction LH among the plurality of threaded holes arrayed along the lower edge of the end plate 120. The present disclosure is, however, not limited to this configuration. For example, the second recess 125 may be formed below the plurality of threaded holes arrayed along the lower edge of the end plate 120. In the respective embodiments, the second recess 125 is configured as a cutout in the thickness direction. The present disclosure is, however, not limited to this configuration. For example, like the first recess 151 of the first embodiment, the second recess 125 may be configured to have a non-zero thickness that is smaller than the thickness of the remaining part of the end plate 120.

D6. Modification 6:

In the first embodiment, the first recess 161 is formed in a rectangular shape when being viewed in the forward direction FD. According to a modification, the first recess 151 may be formed in an arc shape, like the second recess 125.

D7. Modification 7:

In the respective embodiments, the fuel cell vehicle 500 or 500b is a vehicle equipped with the motor M as the driving source. According to a modification, the vehicle may be equipped with an internal combustion engine such as a gasoline engine as the driving source, in addition to the motor M.

The disclosure is not limited to any of the embodiments, the examples and the modifications described above but may be implemented by a diversity of other configurations without departing from the scope of the disclosure. For example, the technical features of any of the embodiments, the examples and the modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the disclosure, there is provided a fuel cell vehicle. This fuel cell vehicle comprises a fuel cell module configured to include a fuel cell stack, a tank configured to store a gas that is supplied to the fuel cell stack, a fuel cell placement chamber configured to place the fuel cell module therein and a tank placement chamber formed on a rear side of the fuel cell placement chamber in a vehicle longitudinal direction of the fuel cell vehicle under a floor of the fuel cell vehicle and configured to place the tank therein. The fuel cell module is placed vertically above the tank such as not to overlap with the tank when being viewed in the vehicle longitudinal direction. In the fuel cell vehicle of this aspect, the fuel cell module is placed vertically above the tank such as not to overlap with the tank when being viewed in the vehicle longitudinal direction. This configuration suppresses a collision between the fuel cell module and the tank even when the fuel cell module moves along the vehicle longitudinal direction toward the tank or when the tank moves along the vehicle longitudinal direction toward the fuel cell module by the inertia force in the event of a collision of the fuel cell vehicle.

(2) In the fuel cell vehicle of the above aspect, the fuel cell module further includes a plate-like supporting frame configured to support the fuel cell stack from below, wherein the supporting frame includes a first recess that is formed in a region including part of a rear end of the supporting frame in the vehicle longitudinal direction and corresponding to an upper portion of the tank in a vertical direction when being viewed in the vehicle longitudinal direction and that is open at least on a vertically lower side and a rear side in the vehicle longitudinal direction. In the fuel cell vehicle of this aspect, the first recess is formed in the supporting frame. Even when the fuel cell module and the tank move relative to each other such that the upper portion of the tank in the vertical direction approaches toward the first recess in the event of a collision of the fuel cell vehicle, this configuration causes the upper portion of the tank in the vertical direction to be located (placed) below the first recess and thereby suppresses a collision between the fuel cell module and the tank. This configuration suppresses a collision between the fuel cell module and the tank in the event of a collision of the fuel cell vehicle even when the fuel cell module is placed at the lower position in the vertical direction, compared with a configuration without the first recess formed in the supporting frame. The configuration that enables the fuel cell module to be placed at the lower position in the vertical direction may reduce the height of the fuel cell placement chamber to achieve downsizing of the fuel cell vehicle or may increase the space for placing the components other than the fuel cell module in the fuel cell placement chamber while keeping the height of the fuel cell placement chamber unchanged. The configuration that enables the fuel cell module to be placed at the lower position in the vertical direction can lower the overall center of gravity of the components placed in the fuel cell placement chamber and improve the driving stability.

(3) In the fuel cell vehicle of the above aspect, the first recess is configured as a cutout formed in a thickness direction of the supporting frame. In the fuel cell vehicle of this aspect, the first recess is configured as a cutout. The first recess of this configuration more reliably suppresses a collision between the supporting frame and the tank in the event of a collision of the fuel cell vehicle, compared with the first recess configured not as a cutout. This accordingly enables the fuel cell stack to be placed at the lower position in the vertical direction.

(4) In the fuel cell vehicle of the above aspect, the fuel cell stack comprises a plurality of stacked unit cells and an end plate placed on a rear side end in the vehicle longitudinal direction along a stacking direction of the plurality of unit cells, wherein the end plate includes a second recess that is formed in a region including part of a rear end of the end plate in the vehicle longitudinal direction and corresponding to an upper portion of the tank in a vertical direction when being viewed in the vehicle longitudinal direction and that is open at least on a vertically lower side and a rear side in the vehicle longitudinal direction. In the fuel cell vehicle of this aspect, the second recess is formed in the end plate. Even when the fuel cell module and the tank move relative to each other such that the upper portion of the tank in the vertical direction approaches toward the second recess in the event of a collision of the fuel cell vehicle, this configuration causes the upper portion of the tank to be located (placed) below the second recess and thereby suppresses a collision between the fuel cell module and the tank. This configuration suppresses a collision between the end plate and the tank in the event of a collision of the fuel cell vehicle even when the end plate is placed at the lower position in the vertical direction, compared with a configuration without the second recess formed in the end plate. The configuration that enables the end plate to be placed at the lower position in the vertical direction may reduce the height of the fuel cell placement chamber to achieve downsizing of the fuel cell vehicle. The configuration that enables the end plate to be placed at the lower position in the vertical direction can lower the overall center of gravity of the components placed in the fuel cell placement chamber and improve the driving stability.

(5) The fuel cell vehicle of the above aspect further comprises a case configured to place the fuel cell stack therein with the end plate exposed and joined with the end plate at a tank-side end face of the case by a fastening member provided to pass through the end plate in a thickness direction, wherein a lowermost portion in the vertical direction of the end plate is located in the vertical direction below a lowermost portion in the vertical direction of the case, and the second recess of the end plate is formed between two through holes provided in the end plate to respectively receive fastening members that are adjacent to each other in a vehicle width direction of the fuel cell vehicle. In the fuel cell vehicle of this aspect, the second recess is formed between the two through holes that are arranged adjacent to each other in the vehicle width direction to receive the fastening members respectively. This configuration suppresses reduction of the joining force of the end plate with the case, while providing the second recess.

(6) In the fuel cell vehicle of the above aspect, the second recess is configured as a cutout formed in a thickness direction of the end plate. In the fuel cell vehicle of this aspect, the second recess is configured as a cutout. The second recess of this configuration more reliably suppresses a collision between the end plate and the tank in the event of a collision of the fuel cell vehicle, compared with the second recess configured not as a cutout. This accordingly enables the fuel cell stack including the end plate to be placed at the lower position in the vertical direction.

(7) In the fuel cell vehicle of the above aspect, the fuel cell stack is arranged to be inclined downward toward the tank in the vehicle longitudinal direction. In the fuel cell vehicle of this aspect, the fuel cell stack is arranged to be inclined downward toward the tank in the vehicle longitudinal direction. This configuration causes water in the fuel cell stack to be moved toward the tank by use of the gravity and to be readily discharged from the fuel cell stack.

(8) In the fuel cell vehicle of the above aspect, the tank placement chamber is configured to place the tank therein such that a longitudinal direction of the tank is aligned with the vehicle longitudinal direction. In the fuel cell vehicle of this aspect, the tank placement chamber is configured to place the tank therein such that the longitudinal direction of the tank is aligned with the vehicle longitudinal direction. This configuration enables a larger tank to be placed in the tank placement chamber, compared with a configuration that places the tank such that the longitudinal direction of the tank is aligned with the vehicle width direction.

The disclosure may be implemented by various aspects other than those described above, for example, a manufacturing method of the fuel cell vehicle, a method of arranging a fuel cell module and a tank in the fuel cell vehicle, a fuel cell module, a supporting frame for a fuel cell stack, and an end plate for a fuel cell stack.

What is claimed is:
1. A fuel cell vehicle, comprising:
a fuel cell module configured to include a fuel cell stack;
a tank configured to store a gas that is supplied to the fuel cell stack;
a fuel cell placement chamber configured to place the fuel cell module therein; and
a tank placement chamber formed on a rear side of the fuel cell placement chamber in a vehicle longitudinal direction of the fuel cell vehicle under a floor of the fuel cell vehicle and configured to place the tank therein,
wherein the fuel cell module is placed vertically above the tank such as not to overlap with the tank when being viewed in the vehicle longitudinal direction, wherein the fuel cell module further includes a plate-like supporting frame configured to support the fuel cell stack from below, and wherein the supporting frame includes a first recess that is formed in a region including part of a rear end of the supporting frame in the vehicle longitudinal direction and corresponding to an upper portion of the tank in a vertical direction when being viewed in the vehicle longitudinal direction and that is open at least on a vertically lower side and a rear side in the vehicle longitudinal direction.

2. The fuel cell vehicle according to claim 1, wherein the first recess is configured as a cutout formed in a thickness direction of the supporting frame.

3. The fuel cell vehicle according to claim 1, wherein the fuel cell stack is arranged to be inclined downward toward the tank in the vehicle longitudinal direction.

4. The fuel cell vehicle according to claim 3, wherein the tank placement chamber is configured to place the tank therein such that a longitudinal direction of the tank is aligned with the vehicle longitudinal direction.

5. A fuel cell vehicle, comprising:
a fuel cell module configured to include a fuel cell stack;
a tank configured to store a gas that is supplied to the fuel cell stack;
a fuel cell placement chamber configured to place the fuel cell module therein; and
a tank placement chamber formed on a rear side of the fuel cell placement chamber in a vehicle longitudinal direction of the fuel cell vehicle under a floor of the fuel cell vehicle and configured to place the tank therein,
wherein the fuel cell module is placed vertically above the tank such as not to overlap with the tank when being viewed in the vehicle longitudinal direction,
wherein the fuel cell stack comprises a plurality of stacked unit cells and an end plate placed on a rear side end in the vehicle longitudinal direction along a stacking direction of the plurality of unit cells, and
wherein the end plate includes a second recess that is formed in a region including part of a rear end of the end plate in the vehicle longitudinal direction and corresponding to an upper portion of the tank in a vertical direction when being viewed in the vehicle longitudinal direction and that is open at least on a vertically lower side and a rear side in the vehicle longitudinal direction.

6. The fuel cell vehicle according to claim 5, further comprising:
a case configured to place the fuel cell stack therein with the end plate exposed and joined with the end plate at a tank-side end face of the case by a fastening member provided to pass through the end plate in a thickness direction, wherein
a lowermost portion in the vertical direction of the end plate is located in the vertical direction below a lowermost portion in the vertical direction of the case, and
the second recess of the end plate is formed between two through holes provided in the end plate to respectively receive fastening members that are adjacent to each other in a vehicle width direction of the fuel cell vehicle.

7. The fuel cell vehicle according to claim 5, wherein the second recess is configured as a cutout formed in a thickness direction of the end plate.

8. The fuel cell vehicle according to claim 5, wherein the fuel cell stack is arranged to be inclined downward toward the tank in the vehicle longitudinal direction.

* * * * *